(12) United States Patent
Yeung et al.

(10) Patent No.: US 9,811,436 B2
(45) Date of Patent: Nov. 7, 2017

(54) VISUAL INDICATOR FOR PORTABLE DEVICE

(71) Applicant: SANDISK TECHNOLOGIES INC., Plano, TX (US)

(72) Inventors: Chun Sum Yeung, Milpitas, CA (US); Yong Huang, San Jose, CA (US); Aran Ziv, Foster City, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/548,192

(22) Filed: Nov. 19, 2014

(65) Prior Publication Data

US 2016/0140011 A1 May 19, 2016

(51) Int. Cl.
- *G06F 3/00* (2006.01)
- *G06F 13/00* (2006.01)
- *G06F 11/32* (2006.01)
- *G06F 9/44* (2006.01)
- *G06F 11/30* (2006.01)
- *G06F 11/22* (2006.01)
- *G06F 13/10* (2006.01)

(52) U.S. Cl.
CPC .......... *G06F 11/325* (2013.01); *G06F 9/4413* (2013.01); *G06F 9/4415* (2013.01); *G06F 11/2289* (2013.01); *G06F 11/3051* (2013.01); *G06F 13/10* (2013.01); *G06F 13/102* (2013.01)

(58) Field of Classification Search
None
See application file for complete search history.

(56) References Cited

U.S. PATENT DOCUMENTS

| | | | | |
|---|---|---|---|---|
| 7,506,219 B2* | 3/2009 | Bhesania | ............ | H04L 43/0811 714/57 |
| 8,078,973 B1* | 12/2011 | Luttmann | ............. | G06F 3/0605 715/705 |
| 8,719,660 B2 | 5/2014 | Peng et al. | | |
| 2003/0225954 A1* | 12/2003 | Wu | ........................ | G06F 11/325 710/305 |
| 2004/0137664 A1* | 7/2004 | Elazar | ..................... | B29C 39/10 438/127 |
| 2004/0260850 A1* | 12/2004 | Yu | ......................... | G06F 13/385 710/104 |
| 2005/0138475 A1* | 6/2005 | Stevens | ................. | G06F 11/325 714/36 |
| 2005/0226104 A1* | 10/2005 | Nishida | ................. | G06F 3/0613 369/30.1 |
| 2008/0056222 A1 | 3/2008 | Waites | | |
| 2012/0072634 A1* | 3/2012 | Mueller | ............. | G06F 13/4072 710/305 |
| 2014/0099997 A1* | 4/2014 | Nakahara | ............. | H04M 19/04 455/566 |
| 2015/0058722 A1* | 2/2015 | Cruz-Hernandez | ... | G06F 3/0488 715/702 |

* cited by examiner

*Primary Examiner* — David E Martinez

(74) *Attorney, Agent, or Firm* — Toler Law Group, PC

(57) ABSTRACT

A portable device may perform a method that includes detecting that the portable device is coupled to a host device via a host interface of the portable device. The method includes generating a visual indication at a visual indicator of the portable device. The visual indication is indicative of a data transfer capacity of the host interface.

22 Claims, 4 Drawing Sheets

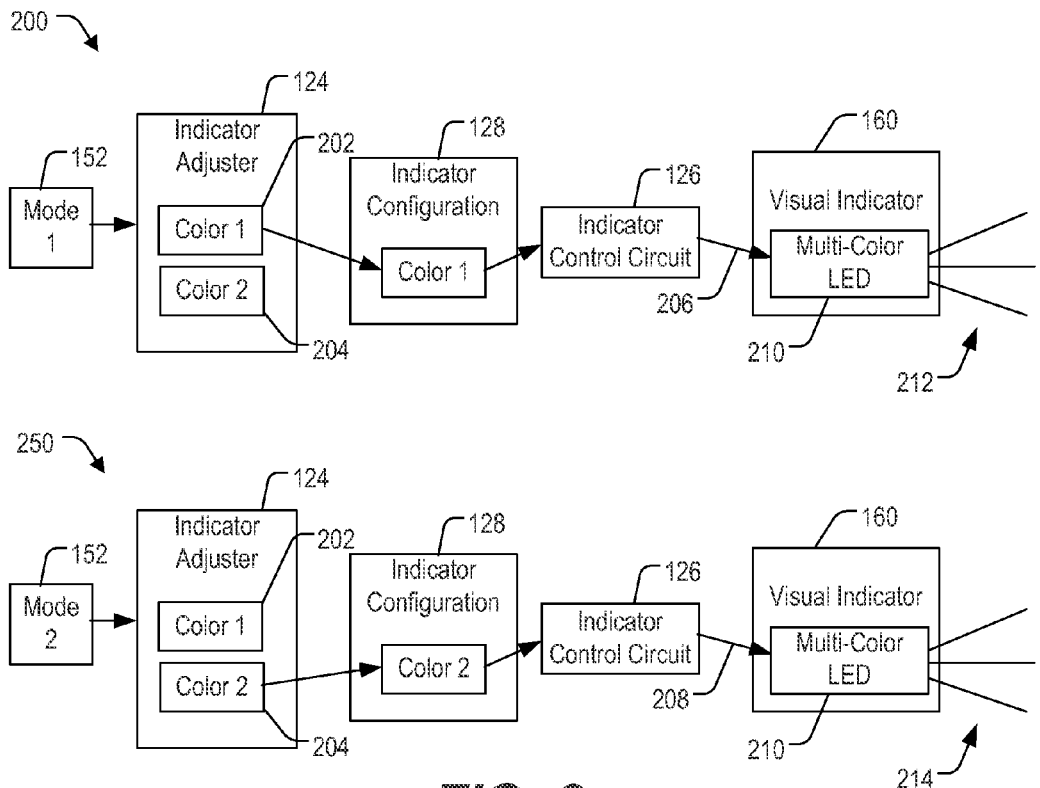
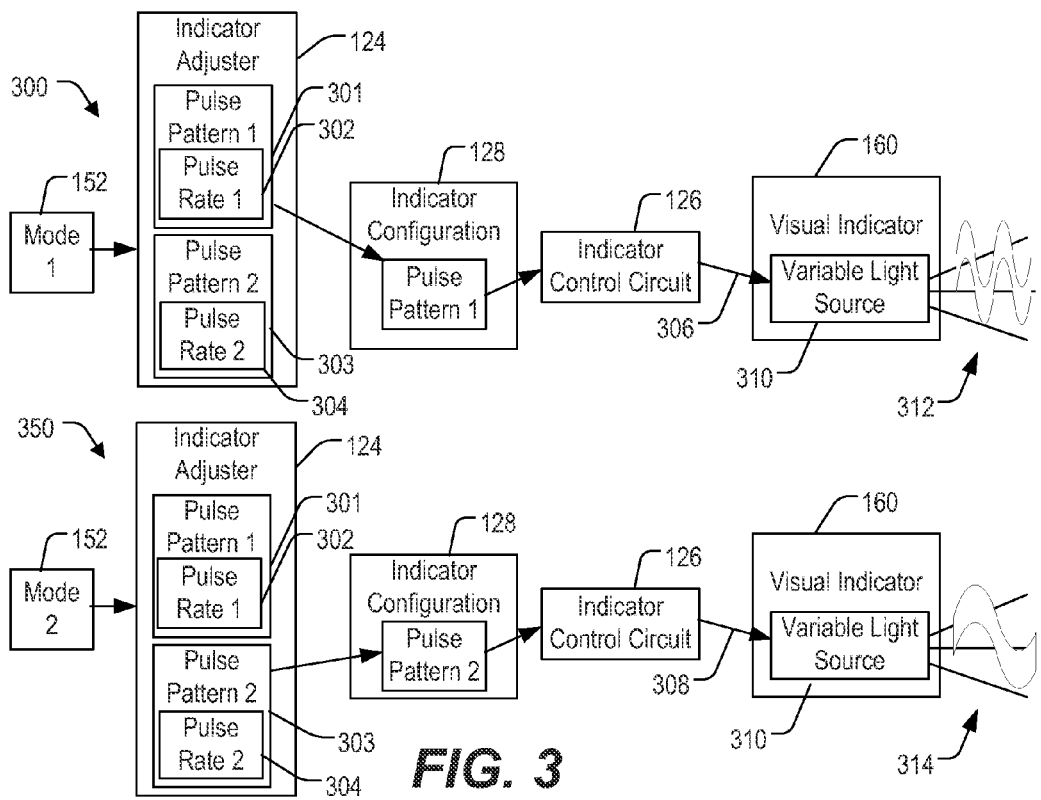
FIG. 2
FIG. 3

VISUAL INDICATOR FOR PORTABLE DEVICE

FIELD OF THE DISCLOSURE

The present disclosure is generally related to portable devices.

BACKGROUND

Non-volatile data storage devices, such as universal serial bus (USB) flash memory devices or removable storage cards, have allowed for increased portability of data and software applications. Data storage devices may communicate with a host device via one or more protocols that define a rate of data communication between the data storage device and the host device. Such protocols may evolve over time so that later versions or revisions of a particular protocol have a higher data communication rate than earlier versions or revisions of the particular protocol. Frequently, later versions of a protocol are designed to be backward compatible with earlier, "legacy" versions of the protocol. Although backwards compatibility enables greater connectivity and may extend a usefulness of older devices that support older versions of the protocol, a physical similarity between older and newer connectors may cause difficulty for users in distinguishing between connectors supporting a legacy version of the protocol with a reduced data communication rate and connectors supporting a more recent version of the protocol with an enhanced data communication rate.

SUMMARY

A portable device includes a visual indicator such as a light emitting diode (LED). When the portable device is coupled to a host device via a host interface, a behavior of the visual indicator is adjusted based on an operating mode or data transfer capacity of the host interface. To illustrate, different data transfer capacities may be indicated with different colors or with different rates of pulsing at the visual indicator, as non-limiting examples. The visual behavior may indicate to a user of the portable device whether data transfer between the portable device and the host device is limited to a data transfer rate that is less than the highest data transfer rate supported by the portable device.

BRIEF DESCRIPTION OF THE DRAWINGS

FIG. 2 is a diagram illustrating particular embodiments of components of the data storage device of FIG. 1;

FIG. 3 is a diagram illustrating particular embodiments of components of the data storage device of FIG. 1;

DETAILED DESCRIPTION

Figure 1:
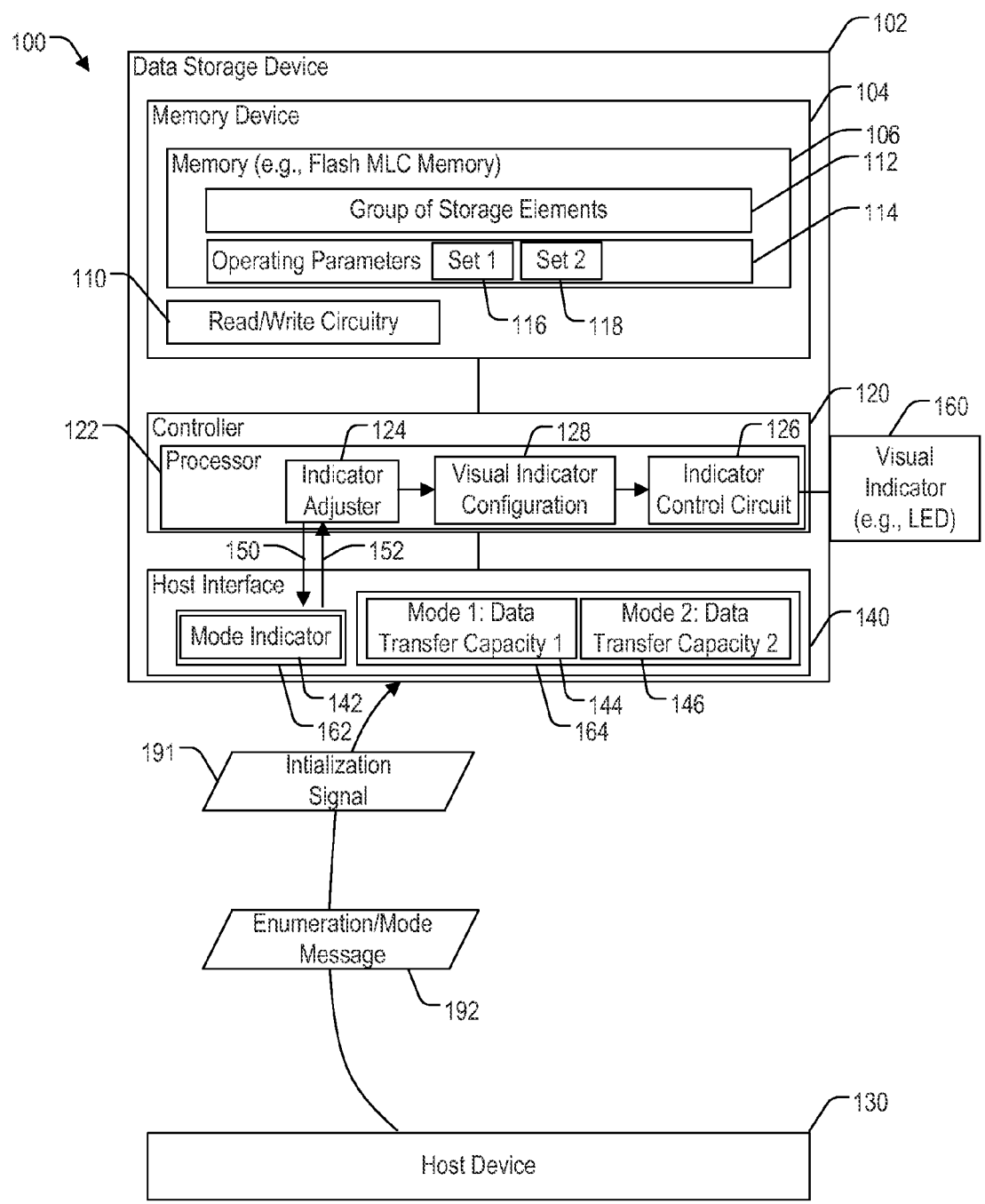
FIG. 1 is a block diagram of a particular illustrative embodiment of a system including a data storage device with a visual indicator of interface performance.

Referring to FIG. 1, a particular embodiment of a system 100 includes a data storage device 102 coupled to a host device 130 via a host interface 140 of the data storage device 102. The data storage device 102 has a visual indicator 160 that is configurable to have a visible behavior that varies based on an operating mode of the host interface 140. As used herein, a "host interface" is an interface that enables a direct physical connection between a device and a host device. As an example, a host interface may include electrical contacts that enable the device to be powered via the host interface using the power supply of the host device. In some embodiments devices may include a network interface that allows the device to communicate with a "network host" device via network messaging (e.g., via Internet Protocol (IP) messaging). Typically in this context, however, a host interface via such a network interface would require the device and the network host device to be directly physically connected via the network interface. This means that a wireless interface would be required to enable a direct physical (wired) connection between a device and a host device.

The host interface 140 is configurable to operate in one or more modes of a set of modes 164, including a first mode 144 having a first data transfer capacity and a second mode 146 having a second data transfer capacity. The visual indicator 160 may therefore allow a user of the data storage device 102 to determine a status of a connection (e.g., an operating mode and/or a data transfer capacity) between the data storage device 102 and the host device 130. The visual indicator 160 may enable a user of the data storage device 102 to visually recognize when communication between the data storage device 102 and the host device 130 is at a transfer capacity that is less than a highest supported capacity of the data storage device 102.

The host device 130 may be configured to provide data to be stored at a memory 106 of the data storage device 102 or to request data to be read from the memory 102. The host device 130 may include a mobile telephone, a music player, a video player, a gaming console, an electronic book reader, a personal digital assistant (PDA), a computer, such as a laptop computer or notebook computer, any other electronic device, or any combination thereof. The host device 130 communicates via the host interface 140 to enable reading from the memory 106 and writing to the memory 106. For example, the host device 130 may operate in compliance with a Joint Electron Devices Engineering Council (JEDEC) industry specification, such as a Universal Flash Storage (UFS) Host Controller Interface specification. As other examples, the host device 130 may operate in compliance with one or more other specifications, such as a Secure Digital (SD) Host Controller specification as an illustrative example. The host device 130 may communicate with the data storage device 102 in accordance with any other suitable communication protocol, as described in further detail below.

The data storage device 102 includes a memory device 104, a controller 120, the visual indicator 160, and the host interface 140. The memory device 104 includes the memory 106, such as a flash multi-level cell (MLC) memory, and circuitry associated with operation of storage elements of the memory 106, such as read/write circuitry 110. In some implementations, the memory 106 may be a "two-dimensional" (2D) memory that has a planar configuration. In some implementations, the memory 106 may be a "three-dimensional" (3D) memory that has a 3D configuration, such as a 3D NAND flash memory or a vertical bit line (VBL) resistive random access memory (ReRAM), as illustrative, non-limiting examples.

The memory 106 includes a representative group of storage elements 112. For example, the group of storage elements 112 may correspond to flash MLC cells coupled to a word line. For example, the data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The controller 120 is configured to receive data and instructions from and to send data to the host device 130 via the host interface 140 while the data storage device 102 is operatively coupled to the host device 130. The controller 120 is further configured to send data and commands to the memory device 104 and to receive data from the memory device 104. For example, the controller 120 is configured to send data and a write command to instruct the memory device 104 to store the data to a specified address. As another example, the controller 120 is configured to send a read command to read data from a specified address of the memory 106.

The controller 120 includes an indicator adjustor 124, an indicator control circuit 126, and a visual indicator configuration 128. The indicator adjustor 124 and the indicator control circuit 126 may be implemented via a processor 122 executing instructions, via dedicated circuitry of the processor 122 and/or of the controller 120, or a combination thereof.

The indicator adjustor 124 is configured to send a control signal 150 to the host interface 140 to retrieve an indication 152 of an operating mode of the host interface 140. The indicator adjustor 124 is configured to set the visual indicator configuration 128 based on the indication 152. The indicator adjustor 124 may cause the controller 120 to access operating parameters 114 from the memory 106. To illustrate, the indicator adjustor 124 may retrieve a first set of parameters 116 in response to the mode indicator 142 indicating a first mode 144 and may retrieve a second set of parameters 118 in response to the mode indicator 142 indicating a second mode 146.

The indicator control circuit 126 is configured to generate one or more control signals to operate the visual indicator 160. For example, the indicator control circuit 126 is configured to access the visual indicator configuration 128 (e.g., in a register or controller random access memory (RAM)) and to adjust an operation of the visual indicator 160 based on the visual indicator configuration 128. To illustrate, as described further with respect to FIGS. 2-3, the indicator control circuit 126 may cause the visual indicator 160 to emit different colors of light based on the visual indicator configuration 128, to emit light having a pulse rate based on the visual indicator configuration 128, or to generate one or more other visually distinctive characteristics to enable a user of the data storage device 102 to distinguish between operating modes of the host interface 140.

The host interface 140 includes a mode indicator 142 that may be stored in a register 162. The host interface 140 is configured to enable data transfer between the host device 130 and the data storage device 102. The host interface 140 is configurable to operate in one or more modes of the set of modes 164, including the first mode 144 having the first data transfer capacity and the second mode 146 having the second data transfer capacity.

Although the host interface 140 is described as being capable of operating in the first mode 144 and in the second mode 146, in some implementations the host interface 140 may be capable of operating in three or more modes and the set of modes 164 may therefore include three or more modes. For example, in an implementation where the host interface 140 includes a USB 3.0-type interface, the host interface 140 may be configurable to operate according to a USB 3.0-type communication protocol, a USB 2.0-type communication protocol, or a USB 1.0-type communication protocol based on a capability of the host device 130.

As an illustrative, non-limiting example, the host interface 140 may correspond to a universal serial bus (USB) 3.0-type interface that operates in accordance with the Universal Serial Bus 3.0 Specification, Revision 1.0, published Jun. 6, 2011, supporting "SuperSpeed" communication at 5 gigabits per second (5 Gbps) and that is backward compatible with USB 2.0-type "high-speed" communication at 480 megabits per second (480 Mbps) and with USB 1.0-type "full-speed" communication at 12 Mbps and "low-speed" operation at 1.5 Mbps. The host interface 140 may be capable of transferring data at a first data transfer capacity (e.g., 5 Gbps) when the host device 130 is configured to operate according to the USB 3.0 specification and to transfer data at the second data transfer capacity (e.g., 480 Mbps) in response to the host device 130 not supporting USB 3.0 and instead supporting USB 2.0-type communications.

In an example implementation, the set of modes 164 may include a USB 3.0-type "SuperSpeed" (SS) mode as the first mode 144 and a USB 2.0-type "high-speed" (HS) mode as the second mode 146. The set of modes 164 may also include a third mode that represents a USB 1.0-type "full-speed" mode and a fourth mode that represents a USB 1.0-type "low-speed" mode. Each of the four modes may correspond to a different color (or a different pulse rate, etc.) of light emitted by the visual indicator 160. As an alternative implementation, one or more of the modes may combined so that the visual indicator 160 displays one color (or pulse rate, etc.) for USB 3.0-type operation and another color (or pulse rate, etc.) for all non-USB 3.0-type operation, such blue for USB 3.0-type operation and red for each of USB 2.0 high-speed, USB 1.0 full-speed, and USB 1.0 low-speed operation.

As another illustrative, non-limiting example, the host interface 140 may correspond to a universal serial bus (USB) 3.1-type interface that operates in accordance with the Universal Serial Bus 3.1 Specification, Revision 1.0, published Jul. 26, 2013, supporting "Superspeed+" communication at 10 Gbps and that is backward compatible to USB 3.0 and earlier USB communication protocols. In an example implementation, the set of modes 164 may include five modes: the first mode 144 may represent a USB 3.1-type "Superspeed+" (SS+) mode, the second mode 146 may represent a USB 3.0-type SuperSpeed mode, a third mode may represent a USB 2.0-type high-speed mode, a fourth mode may represent a USB 1.0-type full-speed mode, and a fifth mode may represent a USB 1.0-type low-speed mode. Each of the five modes may correspond to a different color (or a different pulse rate, etc.) of light emitted by the visual indicator 160. As an alternative implementation, one or more of the modes may combined so that the visual indicator 160 displays one color (or pulse rate, etc.) for USB 3.1-type operation and another color (or pulse rate, etc.) for all non-USB 3.1-type operation, such blue for USB 3.1-type operation and red for each of USB 3.0, USB 2.0, USB 1.0 full-speed, and USB 1.0 low-speed operation.

The host interface 140 is responsive to messaging from the host device 130. For example, the host interface 140 may be configured to detect an initialization signal 191 received from the host device 130. The initialization signal 191 may represent any number of signals used during an initialization process and may include a discovery request from the host device 130 to determine whether any devices are coupled to a device interface of the host device 130. In response to receiving the initialization signal 191, the host interface 140 may enter an initialization and/or enumeration mode during which an enumeration/mode message 192 is received from the host device 130. The enumeration/mode message 192 may provide an indication of an operating mode of the host interface 140 that is stored as the mode indicator 142. The enumeration/mode message 192 may instruct the host interface 140 to operate according to the enumerated operating mode.

Although the host interface 140 is described in particular implementations as supporting a USB communication protocol, in other embodiments the host interface 140 may support one or more other communication protocols instead of, or in addition to, a USB communication protocol. For example, the host interface 140 may support a Serial ATA (SATA) communication protocol. To illustrate, the SATA protocol may include a recent version of the SATA specification (e.g., revision 3.0 of the SATA standard supporting communication at 6 Gbps) and may include one or more generations of the legacy versions of the SATA specification (e.g., revision 2.0 of the SATA standard supporting communication at 3 Gbps). The host interface 140 may be configurable to operate according to one or more supported versions of the SATA protocol. In an example implementation, the first mode 144 may correspond to operation according to revision 3.0 of the SATA standard and the second mode 146 may correspond to operation according to revision 2.0 of the SATA standard.

As another example, the host interface 140 may be configurable to operate according to a peripheral component interconnect express (PCIe) communication protocol. For example, the PCIe communication protocol may include three or more generations of PCIe specifications (e.g., version 4.0 supporting 16 gigatransfers per second (GT/s) per lane, version 3.0 supporting 8 GT/s per lane, and version 2.0 supporting 5 GT/s per lane) that may be supported as one or more of the modes of the set of modes 164.

Although the host interface 140 is illustrated as distinct from and coupled to the controller 120, in other implementations the host interface 140 may be included in the controller 120. For example, the host interface 140 may be implemented on a controller die that also includes the controller 120. Although the data storage device 102 includes the memory device 104, in other implementations the visual indicator 160 and the host interface 140 may be components of a portable device that is not a mass storage device (e.g., not enumerated by the host device 130 as a USB mass storage class device). For example, the visual indicator 160 and the host interface 140 may be implemented in a portable device that includes a wireless transceiver configured to enable wireless communication for the host device 130.

By adjusting the visual indicator configuration 128 based on the mode indicator 142, the visual indicator 160 may display an indicator (e.g., color or pulse rate) that varies based on the operating mode of the host interface 140. This variable behavior may enable a user of the data storage device 102 to visually recognize when communication between the data storage device 102 and the host device 130 is at a transfer capacity that is less than a highest supported capacity of the data storage device 102. For example, the user may recognize the data storage device 102 is plugged into a legacy USB socket that supports USB 2.0 but does not support USB 3.0 and the user may re-connect the data storage device 102 to a USB 3.0 socket of the host device 130 for enhanced data transfer between the data storage device 102 and the host device 130.

Referring to FIG. 2, a particular implementation of components of the data storage device 102 of FIG. 1 is depicted according to a first embodiment 200 and a second embodiment 250. In the first embodiment 200, the mode indicator 152 indicates that the first mode 144 is the operating mode of the host interface 140. The mode indicator 152 is provided to the indicator adjustor 124. Based on the mode indicator 152, the indicator adjustor 124 selects a first color 202 of a set of colors that includes the first color 202 and a second color 204. The indicator adjustor 124 provides the selected color (i.e., the first color 202) to be included in the indicator configuration 128. The indicator control circuit 126 accesses the indicator configuration 128 and identifies the first color 202 in the indicator configuration 128. The indicator control circuit 126 provides one or more first control signals 206 to the visual indicator 160 to cause the visual indicator 160 to emit light 212 having the first color 202. For example, the visual indicator 160 may include a multi-color light-emitting diode (LED). The multi-color LED 210 is configurable to operate in a first mode that emits a first color light and a second mode that emits a second color light, such as by varying a current, a voltage, or one or more other parameters affecting operation of the multi-color LED 210. Responsive to the control signal 206, the multi-color LED 210 generates the first light 212 having the first color 202.

Referring to the second embodiment 250, the mode indicator 152 indicates the second mode 146 of operation of the host interface 140. The indicator adjustor 124 selects, based on the second mode 146, the second color 204 to be included in the indicator configuration 128. The indicator control circuit 126 generates one or more second control signals 208 based on the second color 204 that cause the multi-color LED 210 to emit second light 214 that has the second color 204. For example, the first color 212 may be blue, and the second color 214 may be red.

Although FIG. 2 illustrates operation based on a first color corresponding to the first mode 144 and a second color corresponding to the second mode 146, in other embodiments one or more other colors may be used to correspond to one or more other modes, such as a third color to correspond to a third mode of operation of the host interface 140. In other implementations, other variations of visual behavior may be used other than, or in addition to, various colors. For example, an intensity or brightness of emitted light may be varied based on mode, such that in the first mode 144 a brighter light is emitted from the visual indicator 160, while in the second mode 146 a dimmer light is emitted from the visual indicator 160. Alternatively, or in addition, light emitted from the visual indicator 160 may be controlled to appear as a set of pulses or a "breathing" behavior, and a pulse rate of the visual indicator 160 may vary (e.g., fast or slow pulsing) based on an operating mode of the host interface 140, as described with respect to FIG. 3.

Referring to FIG. 3, a first embodiment 300 and a second embodiment 350 of components of the data storage device 102 are illustrated in an implementation where the visual indicator 160 includes a variable light source 310.

In the first embodiment 300, the mode indicator 152 indicates that the host interface 140 is configured to operate according to the first mode 144. The indicator adjustor 124 selects a first pulse pattern 301 (e.g., selecting a first pulse rate 302) of a set of pulse patterns that includes the first pulse pattern 301 and a second pulse pattern 303. The indicator adjustor 124 provides the first pulse pattern 301 to be included in the indicator configuration 128, such as by retrieving the first parameter set 116 of FIG. 1 corresponding to the first pulse pattern 301 from the memory 106 and providing the first parameter set 116 to the indicator control circuit 126. The indicator control circuit 126 sends one or more first control signals 306 to the variable light source 310 corresponding to the first pulse rate 302.

The variable light source 310 is responsive to the first control signal(s) 306 to emit first pulsing light 312 having a pulse pattern based on the operating mode of the host interface 140 (e.g., based on the data transfer capacity corresponding to the first mode 144). The first pulse pattern 301 may correspond to the variable light source 310 selectively emitting and not emitting light at the first pulse rate 302, such as in a blinking operation, or may correspond to a gradual brightening and dimming of emitted light on a periodic basis, such as a "breathing" behavior. To illustrate, during data transfers between the data storage device 102 and the host device 130, the visual indicator 160 may be operated to indicate a steady light to indicate to a user that data transfer is ongoing. During a period of idle operation (when no data transfer between the host device 130 and the data storage device 102 is ongoing) the visual indicator 160 may display a breathing behavior of periodically brightening and dimming emitted light.

As an example, when the data storage device 102 is coupled to the host device 130, an initialization process may occur during which the host device 130 interrogates the capabilities of the host interface 140 via the initialization signal 191 and sets the operating mode of the host interface 140 via the enumeration/mode message 192. After the operating mode is set, the visual indicator 160 may display a steady light to indicate data transfer is ongoing as the data storage device 102 transfers file system information, device drivers, autoplay information, etc., to the host device 130 as part of a start-up data transfer sequence. After completion of the start-up data transfer sequence and before a first user data transfer occurs, the visual indicator 160 may begin "breathing" at a rate that indicates the operating mode, such as at approximately two breathing cycles per second for a USB 3.1-type operating mode and at approximately one breathing cycle per second for a USB 3.0-type or lower USB-type operating mode.

Although the visual indicator 160 may indicate a "transferring data" status or an "idle" status, the operating modes of the set of modes 164 that are indicated by the visual indicator 160 do not include a "transferring data" mode and an "idle" mode. In contrast, the operating modes of the set of modes 164 represent configurations of the host interface 140 (e.g., enumerated by the host device 130) to operate as in accordance with a specific communication protocol or data transfer capacity. For example, the host interface 140 configured to operate in a USB 3.1-type operating mode may use three pairs of differential signaling pins to transfer data encoded using a 128b/132b encoding scheme, while the host interface 140 configured to operate in accordance with a USB 2.0-type operating mode may use a single pair of the three pairs of differential signaling pins to transfer data encoded using an 8b/10 encoding scheme.

In the second embodiment 350, the mode indicator 152 indicates that the host interface 140 is configured to operate according to the second mode 146. The indicator adjustor 124 selects the second pulse pattern 303 (e.g., selecting a second pulse rate 304) and the indicator adjustor 124 provides the second pulse pattern 303 to be included in the indicator configuration 128. The indicator control circuit 126 sends one or more second control signals 308 to the variable light source 310 corresponding to the second pulse pattern 303. The variable light source 310 is responsive to the second control signal(s) 308 to emit second pulsing light 314 having the second pulse pattern 303 to indicate the operating mode of the host interface 140 (e.g., based on the data transfer capacity corresponding to the second mode 146).

Although the indicator adjuster 124 is illustrated as selecting a pulse pattern from among the first pulse pattern 301 and the second pulse pattern 303 that may correspond to "on/off" pulses or blinking of the visual indicator 160, it should be understood that in some implementations one or more of the pulse patterns 301, 303 may correspond to a smoothly varying behavior, such as a "breathing" pattern that brightens and dims in a substantially sinusoidal pattern (without having discrete on/off "pulses"). To illustrate, one operating mode may be indicated by discrete pulses (e.g., a square wave waveform pattern) and another operating mode may be indicated by a smoothly varying periodic behavior (e.g., a sinusoidal waveform pattern). Although the indicator adjuster 124 is illustrated as selecting a pulse pattern from among the first pulse pattern 301 and the second pulse pattern 303, it should be understood that in some implementations the pulse patterns 301, 303 may correspond to matching waveforms having different pulse rates (e.g., the first pulse pattern 301 and the second pulse pattern 303 differ in pulse frequency without differing in pulse shape). In such implementations, selecting one of the pulse patterns 301, 303 may be equivalent to selecting a pulse rate 302, 304.

Figure 4:
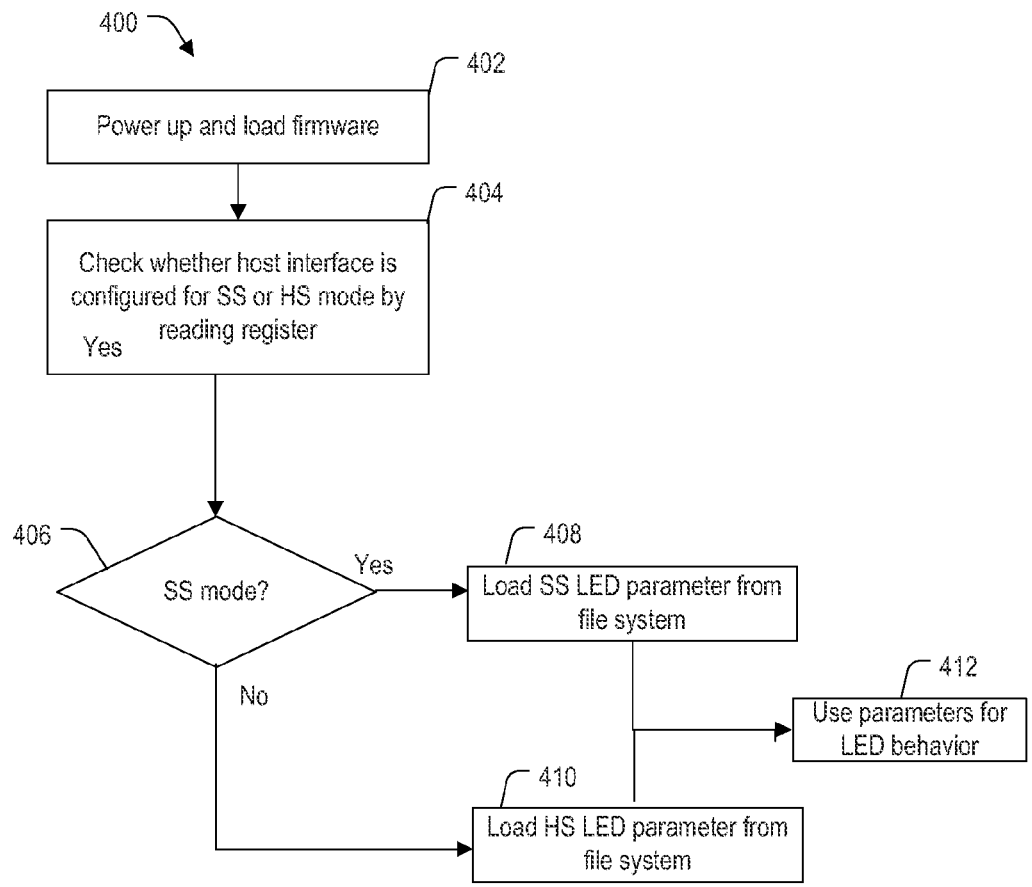
FIG. 4 is a flow chart of a particular illustrative embodiment of a method that may be performed by the data storage device of FIG. 1.

Referring to FIG. 4, a flow chart of a method 400 that may be performed in a data storage device that includes a visual indicator and a USB-type host interface is depicted. The method 400 may be performed in response to the data storage device being coupled to a host device via the USB-type host interface. For example, the method 400 may be performed at the data storage device 102 of FIG. 1.

The data storage device may power up and load firmware, at 402. For example, the processor 122 of FIG. 1 may load executable code from the memory 104 (or from another memory, such as a controller read-only memory (ROM)) upon powering up. The executable code may enable the processor 122 to control operations at the data storage device 102, such as to control operation of the visual indicator 160.

The processor 122 may check whether the host interface 140 is configured for operation in accordance with a USB 3.0 interface type (SuperSpeed (SS) operation) or is configured for operation in accordance with a USB 2.0 interface type (high-speed (HS) operation), at 404. The processor 122 may check the interface configuration by reading data from the register 162, such as the mode indicator 142 that is retrieved responsive to the control signal 150 and communicated to the processor 122 via the indication 152.

In response to the host interface 140 being configured for operation in accordance with a USB 3.0 interface type, as determined at 406, the processor 122 may load a first parameter set corresponding to operating a LED of the visual indicator 160 to indicate SS operation, at 408. For example, the processor 122 may load the first set 116 of operating parameters from the memory 104 (or from other memory, such as a controller read-only memory (ROM)).

In response to the host interface 140 being configured for operation in accordance with a USB 2.0 interface type, as determined at 406, the processor 122 may load a second parameter set corresponding to operating the LED of the visual indicator 160 to indicate HS operation, at 410. For example, the processor 122 may load the second set 118 of operating parameters from the memory 104.

The parameters may be used to control behavior of the LED, at 412. For example, the parameters may be provided to the indicator control circuit 216 as part of visual indicator configuration. The LED behavior controlled by the parameters may indicate the interface type via color, as described with respect to FIG. 2, via a pulse rate, such as a "breathing" frequency during idle periods, as described with respect to FIG. 3, via one or more other distinguishable visual characteristics, or any combination thereof.

Figure 5:
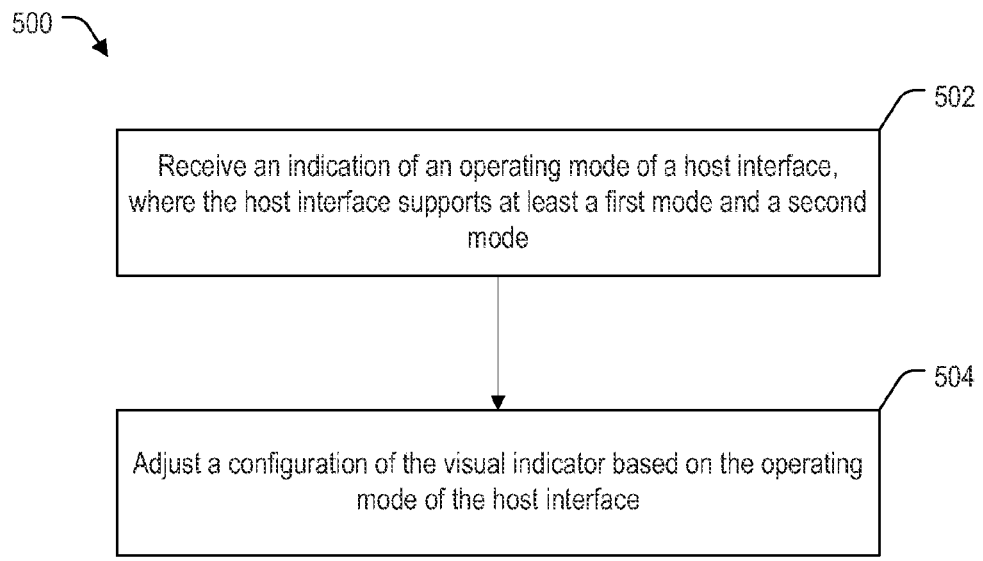
FIG. 5 is a flow chart of another particular illustrative embodiment of a method that may be performed by the data storage device of FIG. 1.
Figure 6:
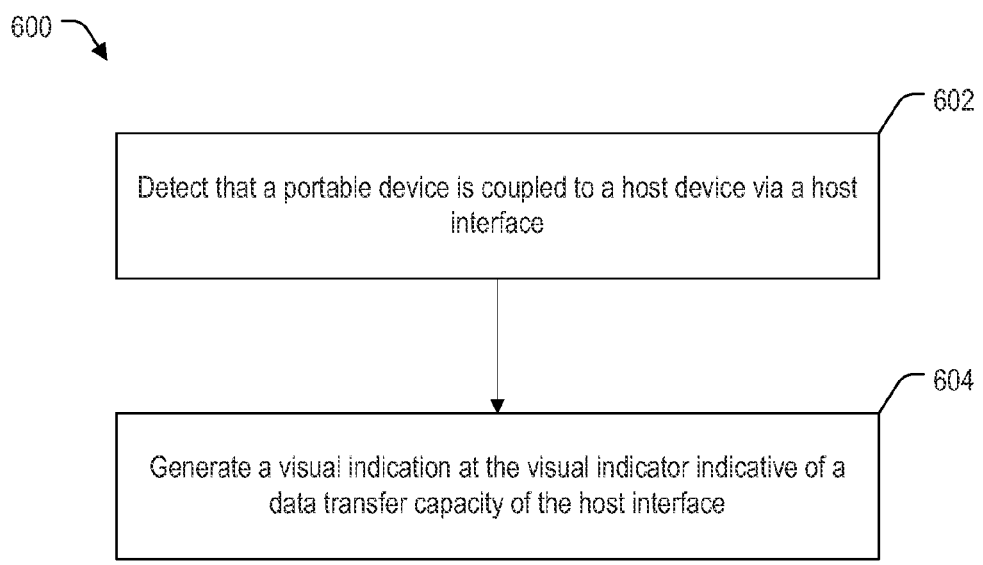
FIG. 6 is a flow chart of another particular illustrative embodiment of a method that may be performed by the data storage device of FIG. 1.

Although the method 400 describes operations in an example implementation of the data storage device 102 where the host interface 140 includes a USB-type interface and where the visual indicator 160 includes a LED, in other implementations the data storage device 102 may visually indicate a type of connectivity with the host device 130 in accordance with other interface protocols and other indicator types. FIGS. 5-6 illustrate other examples of methods that may be performed by the data storage device 102.

Referring to FIG. 5, a flow chart of a method 500 that may be performed in a data storage device that includes a visual indicator and a host interface is depicted. The method 500 may be performed while the data storage device is coupled to a host device via the host interface. For example, the method 500 may be performed at the data storage device 102 of FIG. 1.

The method 500 includes receiving an indication of an operating mode of the host interface, at 502. The host interface supports at least a first mode and a second mode. For example, the host interface may be the host interface 140 of FIG. 1 that supports the first mode 144 and the second mode 146. The first mode may be associated with a first data transfer capacity and the second mode may be associated with a second data transfer capacity. For example, the second data transfer rate may be less than the first data transfer capacity. In an illustrative implementation, the first mode corresponds to a universal serial bus (USB) Super-Speed (SS) mode and the second mode corresponds to a USB high-speed (HS) mode.

In the data storage device 102 of FIG. 1, the host interface 140 may determine the operating mode based on the enumeration message 192 received from the host device 130. The host interface 130 may store the indication of the operating mode in the register 162 as the mode indicator 142. The processor 122 generates the control signal 150 to access the register 162 and receives the indication 152 responsive to the control signal 150.

A configuration of the visual indicator is adjusted based on the operating mode of the host interface, at 504. For example, the data storage device 102 of FIG. 1 stores the first set 116 of operating parameters of the visual indicator 160 and the second set 118 of operating parameters of the visual indicator 160. Adjusting the configuration of the visual indicator 160 may include the indicator adjuster 124 selecting the first set 116 of operating parameters in response to the operating mode being the first mode 144 and selecting the second set 118 of parameters in response to the operating mode being the second mode 146. The selected set of parameters may be provided to the indicator control circuit 126 via the visual indicator configuration 128.

In other implementations, adjusting the configuration of the visual indicator includes configuring the visual indicator to have a first color in response to the operating mode being the first mode. In response to the operating mode being the second mode, the visual indicator may be configured to have a second color. To illustrate, the visual indicator may include a multi-color light emitting diode (LED) such as depicted in FIG. 2.

In some implementations, adjusting the configuration of the visual indicator includes setting a first pulse rate of the visual indicator in response to the operating mode being the first mode. In response to the operating mode being the second mode, a second pulse rate of the visual indicator may be set. For example, the first pulse rate may be faster than the second pulse rate, such as depicted in FIG. 3.

Adjusting the configuration of the visual indicator may cause the visual indicator to provide visual information to allow a viewer (e.g., a user of the data storage device 102) of the visual indicator to distinguish between operation of the host interface according to the first mode and operation of the host interface according to the second mode. Based on the visual information provided by the visual indicator (e.g., pulsing/breathing quickly or slowly and/or emitting light of one color or another color, as illustrative, non-limiting examples), the user may be able to determine whether a data transfer capacity of the data storage device is under-utilized. The user may enhance utilization of the data storage device, such as by re-coupling the data storage device 102 to a higher-capacity interface of the host device or of another host device, to reduce delays associated with accessing data at the data storage device and to improve a user experience (e.g., faster data transfer).

Referring to FIG. 6, a flow chart of a method 600 that may be performed in a data storage device that includes a visual indicator and a host interface is depicted. For example, the method 600 may be performed at the data storage device 102 of FIG. 1.

The method 600 includes detecting that the portable device is coupled to a host device via the host interface, at 602. For example, the portable device may include a flash storage device with a USB interface. The portable device may detect connection with the host device via the USB interface according to a USB protocol, such as by detecting a power supply or voltage at a particular pin of a USB connector of the host interface. The device may be enumerated by the host device and configured to operate according to a particular mode (e.g., a particular USB device capability type) that sets a data transfer capability between the host device and the data storage device. For example, a USB 3.0 mode may support a data transfer capability of up to 5 gigabits per second (Gbps) and a USB 2.0 mode may support a data transfer capability of up to 480 megabits per second (Mbps).

A visual indication indicative of a data transfer of the host interface is generated at the visual indicator, at 604. As an example, generating the visual indication may include emitting, from the visual indicator, pulsing light having a pulse rate based on the data transfer capacity. To illustrate, the visual indication may be generated as described with respect to FIG. 3. As another example, generating the visual indication may include emitting, from the visual indicator, light having a color based on the data transfer capacity. To illustrate, the visual indication may be generated as described with respect to FIG. 2.

As compared to the method 500 of FIG. 5, where a configuration of a visual indicator is updated based on operating mode, the method 600 corresponds to a data transfer capacity of the host interface. For example, the host interface 140 of FIG. 1 may be configurable to support two different modes of operation (e.g., a PCIe mode and a SATA mode) that provide substantially the same data transfer capacity between the data storage device 102 and the host device 130. The two different modes may be distinguished via the visual indicator 160 in accordance with the method 500 of FIG. 5 and may not be distinguished via the visual indicator 160 in accordance with the method 600.

Providing the visual indication that is indicative of the data transfer capacity allows a user of the data storage device to detect a mode of operation or relative speed of data transfer between the data storage device and the host device. Based on the visual behavior of the indication (e.g., pulsing/breathing quickly or slowly and/or emitting light of one color or another color, as illustrative, non-limiting examples), the user may be able to determine whether a capacity of the data storage device is under-utilized, such as when a SS-type USB connector of the data storage device is mated with a HS-type connector of the host device. In response, the user may enhance utilization of the data storage device, such as by re-coupling to a higher-capacity interface of the host device or of another host device, improving a user experience by reducing delays associated with accessing data at the data storage device.

Although FIGS. 1-6 describe embodiments where operating modes and/or data transfer capacities of the host interface 140 are indicated visually, in other implementations operating modes and/or data transfer capacities of the host interface 140 may be indicated non-visually, such as via audible indicators (e.g., differing beeping patterns, differing tones, pitches, songs/ringtones, etc.), via haptic indicators (e.g., differing vibrational rates or patterns), via one or more other types of indicators, or any combination thereof. Although FIGS. 1-6 describe implementations where different visual indicators are used for different modes and/or capacities, in other implementations indicators may be used for one or more operating modes and omitted for one or more other operating modes. For example, an indicator may be provided as a "warning" when the host interface 140 is configured to operate at a lower data transfer capacity than a highest available data transfer capacity of the host interface 140. To illustrate, if the host interface 140 supports USB 3.1, 3.0, 2.0, and 1.0 communications, the data storage device 102 may generate an indicator (e.g., visual, audible, and/or haptic) when the host interface 140 is configured by the host device 130 to operate using USB 3.0, 2.0, or 1.0 communications and may not generate an indicator when the host interface 140 is configured by the host device 130 to operate using USB 3.1 communications.

Although various components depicted herein are illustrated as block components and described in general terms, such components may include one or more microprocessors, state machines, or other circuits configured to enable the controller 120 of FIG. 1 to configure the visual indicator 160 to indicate an operating mode of the host interface 140. For example, the indicator adjuster 124 and the indicator control circuit 126 may represent physical components, such as hardware controllers, state machines, logic circuits, or other structures, to enable determination of an operating mode of the host interface 140 and to adjust a behavior of the visual indicator 160 in response to the operating mode.

Functions described with respect to the controller 120 may be implemented using a microprocessor or microcontroller programmed to initialize and/or update the visual indicator configuration 128. For example, the controller 120 may detect an operating mode of the host interface 140 by reading the register 162 and, in response to detecting the operating mode, retrieve a set of parameters 116 or 118 from the non-volatile memory 104, and provide the parameters 116 or 118 to the indicator control circuit 126. In a particular embodiment, the controller 120 includes the processor 122 that executes instructions that are stored at the non-volatile memory 104. Alternatively, or in addition, executable instructions that are executed by the processor 122 may be stored at a separate memory that is not part of the non-volatile memory 104, such as at a read-only memory (ROM).

The data storage device 102 may include one or more semiconductor memory devices. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the scope of the disclosure as described herein and as understood by one of skill in the art.

In a particular embodiment, the data storage device 102 may be implemented in a portable device configured to be selectively coupled to one or more external devices. For example, the data storage device 102 may be coupled to a packaged apparatus such as a wireless telephone, a personal digital assistant (PDA), a gaming device or console, a portable navigation device, or other device that uses internal non-volatile memory. In a particular embodiment, the data storage device 102 may include a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operation at a mobile device that includes a host interface that supports at least a first mode, a second mode, and a third mode, the method comprising:
    detecting that the mobile device is coupled to a host device via the host interface; and
    based on an operating mode of the host interface corresponding to one of the first mode, the second mode, or the third mode:
        adjusting a configuration of a visual indicator of the mobile device based on the operating mode of the host interface; and adjusting a vibration rate, a vibration pattern, or both, of a haptic indicator of the mobile device based on the operating mode of the host interface.

2. The method of claim 1, wherein:
the first mode corresponds to a universal serial bus (USB) super speed (SS) mode;
the second mode corresponds to a USB high speed (HS) mode; and
the third mode corresponds to a USB full speed (FS) mode.

3. An apparatus comprising:
means for storing an indication of an operating mode of a host interface of a data storage device, wherein the host interface supports at least a first mode, a second mode, and a third mode; and
means for adjusting, based on the operating mode of the host interface corresponding to one of the first mode, the second mode, or the third mode:
a configuration of a visual indicator of the data storage device based on the operating mode of the host interface; and
a vibration rate, a vibration pattern, or both, of a haptic indicator of the data storage device based on the operating mode of the host interface.

4. The apparatus of claim 3, wherein the means for adjusting causes the visual indicator to provide visual information to enable a viewer of the visual indicator to distinguish between operation of the host interface according to the first mode, operation of the host interface according to the second mode, and operation of the host interface according to the third mode.

5. The apparatus of claim 3, wherein:
the first mode is associated with a first data transfer capacity;
the second mode is associated with a second data transfer capacity that is less than the first data transfer capacity; and
the third mode is associated with a third data transfer capacity that is less than the second data transfer capacity.

6. The apparatus of claim 3, wherein the means for adjusting is further configured to:
in response to the operating mode corresponding to the first mode, cause the visual indicator to have a first color;
in response to the operating mode corresponding to the second mode, cause the visual indicator to have a second color; and
in response to the operating mode corresponding to the third mode, cause the visual indicator to have a third color.

7. The apparatus of claim 6, wherein the visual indicator includes a multi-color light emitting diode (LED).

8. The apparatus of claim 3, wherein the means for adjusting is further configured to:
in response to the operating mode corresponding to the first mode, set a first pulse rate of the visual indicator;
in response to the operating mode corresponding to the second mode, set a second pulse rate of the visual indicator; and
in response to the operating mode corresponding to the third mode, set a third pulse rate of the visual indicator.

9. The apparatus of claim 3, wherein:
the means for adjusting is further configured to:
select a first set of operating parameters of the visual indicator in response to the operating mode corresponding to the first mode;
select a second set of operating parameters of the visual indicator in response to the operating mode corresponding to the second mode; and
select a third set of operating parameters of the visual indicator in response to the operating mode corresponding to the third mode; and
the data storage device stores the first set of operating parameters, the second set of operating parameters, and the third set of operating parameters.

10. A data storage device comprising:
a host interface, wherein the host interface is configured to support at least a first mode, a second mode, and a third mode; and
a processor coupled to the host interface and configured to, based on an operating mode of the host interface corresponding to one of the first mode, the second mode, or the third mode:
adjust a configuration of a visual indicator based on the operating mode of the host interface; and
adjust a vibration rate, a vibration pattern, or both, of a haptic indicator based on the operating mode of the host interface.

11. The data storage device of claim 10, further comprising a non-volatile memory that stores a first set of operating parameters of the visual indicator, a second set of operating parameters of the visual indicator, and a third set of operating parameters of the visual indicator, wherein the processor is further configured to adjust the configuration of the visual indicator by:
selecting the first set of operating parameters in response to the operating mode corresponding to the first mode,
selecting the second set of operating parameters in response to the operating mode corresponding to the second mode, and
selecting the third set of operating parameters in response to the operating mode corresponding to the third mode.

12. The data storage device of claim 10, wherein the processor includes:
an indicator adjustment module configured to:
receive, from the host interface, an indication of the operating mode of the host interface; and
adjust the configuration of the visual indicator based on the received indication; and
an indicator control circuit configured to adjust an operation of the visual indicator responsive to the configuration.

13. The data storage device of claim 10, further comprising the visual indicator, wherein the visual indicator includes a multi-color light emitting diode (LED).

14. The data storage device of claim 13, wherein the processor is further configured to adjust a beeping pattern, a tone, a pitch, a song, a ringtone, or a combination thereof, of an audible indicator based on the operating mode of the host interface.

15. The data storage device of claim 10, wherein the processor is further configured to access a register of the host interface to retrieve an indication of the operating mode.

16. The data storage device of claim 10, wherein the processor is further configured to set a pulse rate of the visual indicator based on the operating mode.

17. The data storage device of claim 10, wherein the host interface includes a register configured to store an indication of the operating mode based on an enumeration message received from a host device.

18. The data storage device of claim 10, wherein adjusting the configuration of the visual indicator causes the visual indicator to provide visual information to enable a viewer of the visual indicator to distinguish between operation of the host interface according to the first mode, operation of the host interface according to the second mode, and operation of the host interface according to the third mode.

19. The data storage device of claim 10, wherein:
the first mode is associated with a first data transfer capacity;
the second mode is associated with a second data transfer capacity that is less than the first data transfer capacity; and
the third mode is associated with a third data transfer capacity that is less than the second data transfer capacity.

20. The data storage device of claim 10, wherein:
the first mode corresponds to a universal serial bus (USB) super speed (SS) mode;
the second mode corresponds to a USB high speed (HS) mode; and
the third mode corresponds to a USB full speed (FS) mode.

21. The data storage device of claim 10, wherein the processor is further configured to:
in response to the operating mode corresponding to the first mode, cause the visual indicator to have a first color;
in response to the operating mode corresponding to the second mode, cause the visual indicator to have a second color; and
in response to the operating mode corresponding to the third mode, cause the visual indicator to have a third color.

22. The data storage device of claim 10, wherein the processor is further configured to:
in response to the operating mode corresponding to the first mode, set a first pulse rate of the visual indicator;
in response to the operating mode corresponding to the second mode, set a second pulse rate of the visual indicator; and
in response to the operating mode corresponding to the third mode, set a third pulse rate of the visual indicator.

\* \* \* \* \*